US000002024H

(19) United States

(12) Statutory Invention Registration

Kelley et al.

(10) Reg. No.: US H2024 H

(43) Published: Jun. 4, 2002

(54) ADJUSTABLE CONTROL ASSEMBLY

(75) Inventors: Craig B. Kelley, Dunlap; Daniel E. Shearer; Susan M. Boast, both of Metamora, all of IL (US)

(73) Assignee: Caterpillar Inc., Peoria, IL (US)

(21) Appl. No.: 09/216,525

(22) Filed: Dec. 18, 1998

(51) Int. Cl.[7] ..... G05G 1/00

(52) U.S. Cl. ..... 74/491; 74/523; 180/334

(56) References Cited

U.S. PATENT DOCUMENTS

| | | | | |
|---|---|---|---|---|
| 4,140,200 | A | 2/1979 | Tucek | 180/77 H |
| 4,355,819 | A | 10/1982 | Frisbee | 280/752 |
| 4,478,308 | A | 10/1984 | Klaassen | 180/326 |
| 4,589,639 | A | 5/1986 | Peifer et al. | 267/150 |
| 4,821,837 | A | 4/1989 | Fifer | 180/334 |
| 5,052,512 | A | 10/1991 | Pakosh et al. | 180/329 |
| 5,409,080 | A | 4/1995 | Templeton et al. | 180/326 |
| 5,567,004 | A | 10/1996 | Pietzsch | 296/190 |

*Primary Examiner*—Harold J. Tudor

(74) *Attorney, Agent, or Firm*—Kevin M. Kercher

(57) ABSTRACT

An adjustable control assembly includes a plurality of control members. The control members preferably include moveable portions such as levers that are manipulable to accomplish a desired operation of heavy duty machinery such as construction equipment, for example. The control members are supported on support plates that are pivotally moveable relative to each other about a single pivot axis. A locking mechanism is provided to selectively lock the support plates into a chosen position relative to each other. By adjusting the positions of the support plates, a variety of operator needs and preferences are readily accommodated providing effective and efficient access to the control members.

20 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ADJUSTABLE CONTROL ASSEMBLY

Technical Field

This invention generally relates to control assemblies useful for operating heavy duty machinery such as construction equipment and, more particularly to an adjustable assembly for adjusting the position of the control members.

Background Art

A variety of control arrangements are currently used in heavy duty machinery such as construction equipment, for example. Depending on the number of functions that a particular machine can perform, the operator is presented with a plurality of control members such as levers that are moveable to effect a desired operation. One challenge that designers and manufacturers face is providing the control members, such as levers, to an operator in positions where the control members are readily accessible in a safe and efficient manner. Ergonomic concerns such as operator fatigue and convenience must play a role in determining the placement of the control members. Additionally, the varying preferences of different operators ideally should be accommodated.

It has been proposed to include control arrangements within heavy duty machinery that have adjustable positions to accommodate the needs and desires of different operators. Two examples are shown in U.S. Pat. No. 5,409,080, which issued on Apr. 25, 1995, and U.S. Pat. No. 4,478,308, which issued on Oct. 23, 1984. In each of those patents, control arrangements having adjustable features are disclosed. In U.S. Pat. No. 5,409,080, an entire console or platform is selectively moveable in a forward or rearward direction to change the position of the console relative to an operator's seat within a tractor. In U.S. Pat. No. 4,478,308, a pivotable arm rests supports a joy stick-style lever so that the lever can be comfortably grasped within the operator's hand.

While such systems have proven useful in some situations, there is a need to accommodate a plurality of control members that are manipulated by a single hand of an operator. This invention provides such an arrangement with an adjustability feature that minimizes operator fatigue, maximizes operator comfort and accommodates a variety of operator preferences.

DISCLOSURE OF THE INVENTION

In general terms, this invention is an adjustable control assembly. A plurality of control members that are independently and selectively manipulable by an operator are provided. A first support supports at least a first one of the control members and the first support is pivotally moveable relative to a base portion about a pivot axis. A second support supports at least a second one of the control members and is pivotally moveable relative to the base portion and the first support about the same pivot axis.

The two supports preferably are pivotable relative to the base and each other so that the plurality of control members can be positioned and spaced apart relative to each other in a chosen position that accommodates a particular operator's preferences. Providing two moveable supports that both are pivotable about a single pivot axis provides a compact and efficient arrangement that is readily adjustable to meet a particular operator's needs.

The various features and advantages of this invention will become apparent from the following description of what is currently considered the best mode of practicing this invention. The drawings that accompany the description can be briefly described as follows.

BEST MODE FOR CARRYING OUT THE INVENTION

Figure 1:
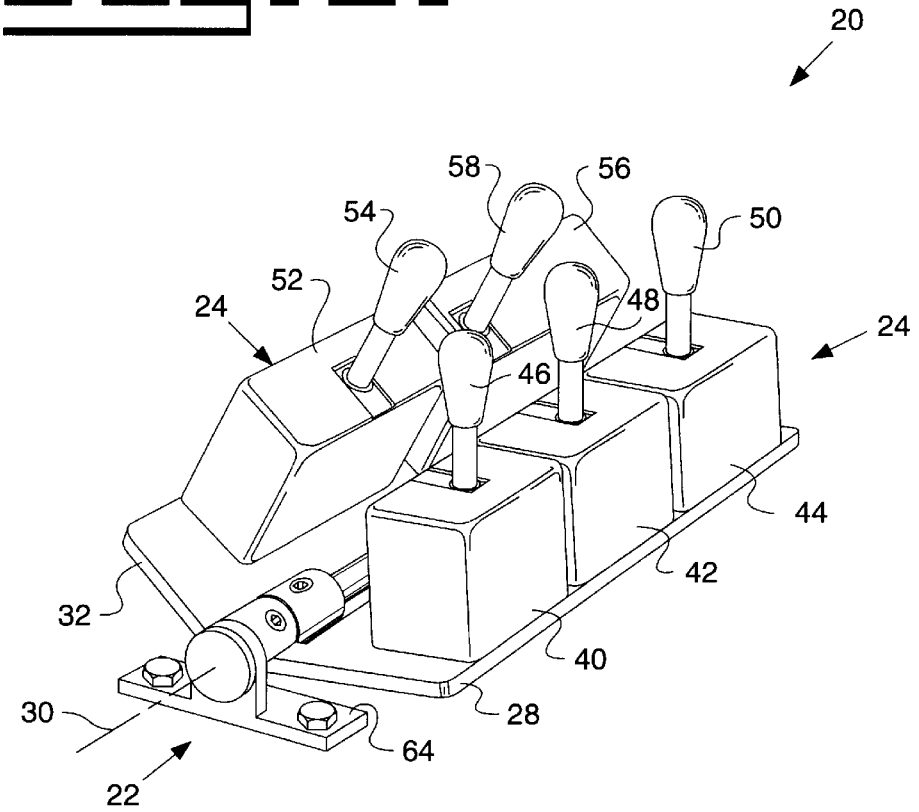
FIG. 1 is a perspective, diagrammatic illustration of a control assembly designed according to this invention.

FIG. 1 illustrates an adjustable control assembly 20 including a base 22 and a plurality of control members 24. A first support plate 28 is pivotably moveable relative to the base 22 about a pivot axis 30. A second support plate 32 is pivotally moveable relative to the base and the first support plate 28 about the same pivot axis 30. As can be appreciated from FIG. 2, by adjusting the angles $\alpha$ and 74, the relative positions of the support plates 28 and 32 are selectively moveable so that the control members 24 can be placed into a variety of orientations.

The preferred embodiment of this invention includes a plurality of control members 24 that have a size and are positioned relative to each other such that they all fit generally within the grasp of a single human hand 60. Of course, this invention has application in situations where control members are necessarily of a larger size and require different spatial relationships.

In the illustrated embodiment, three control member housings 40, 42, 44 are supported by the first support plate 28. Each of the housings 40, 42 and 44 support a control lever 46, 48 and 50, respectively. The control levers 46, 48 and 50 are selectively moveable by an operator to accomplish an adjustment of various machine components, for example. Similarly, the support plate 32 supports a first housing 52 which supports a moveable lever member 54. A second housing 56 and lever 58 are also supported on the second support plate 32.

Figure 2:
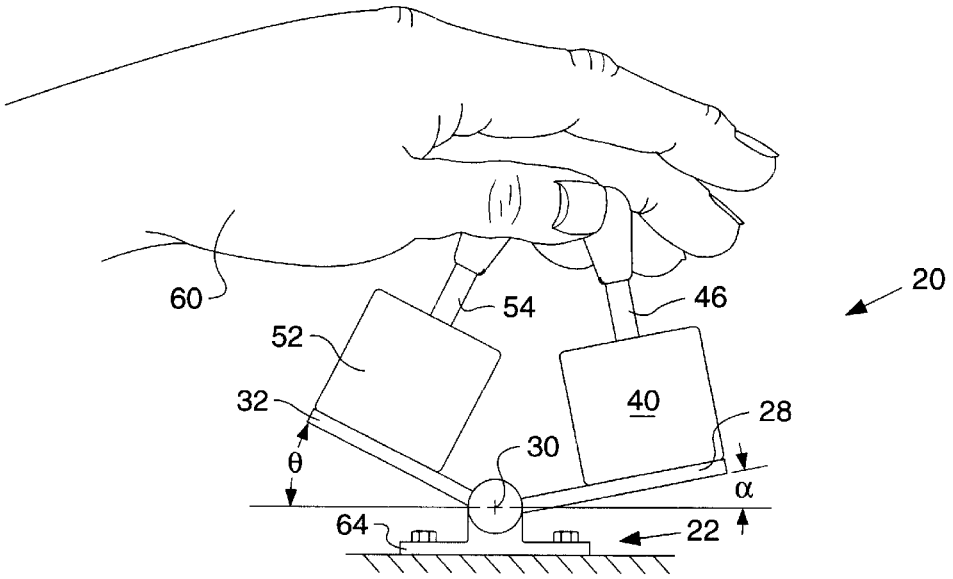
FIG. 2 is a side, elevational view of the embodiment of FIG. 1 illustrating an example proportional size relationship between the assembly and an operator's hand.

In situations where the adjustable control assembly 20 is operated by a single hand of an operator (as shown in FIG. 2) it is possible, for example, for the levers 54 and 58 to be moved toward the pivot axis 30 by pressing on them with the medial and lateral side of an operator's palm. The levers 46, 48 and 50 can be moved as desired by manipulating one's fingers. As can be best appreciated from FIG. 2, all of the control member levers generally fit within the grasp of the operator's single hand 60. Since the support plates 28 and 32 are moveable relative to each other about the single pivot axis 30, the spacing and orientation of the control members can be varied to accommodate different operator hand sizes and preferences. The adjustable features of this invention not only accommodate varying operator needs but reduce the possibility for operator fatigue and enhance operator efficiency while using the control assembly 20.

Figure 3:
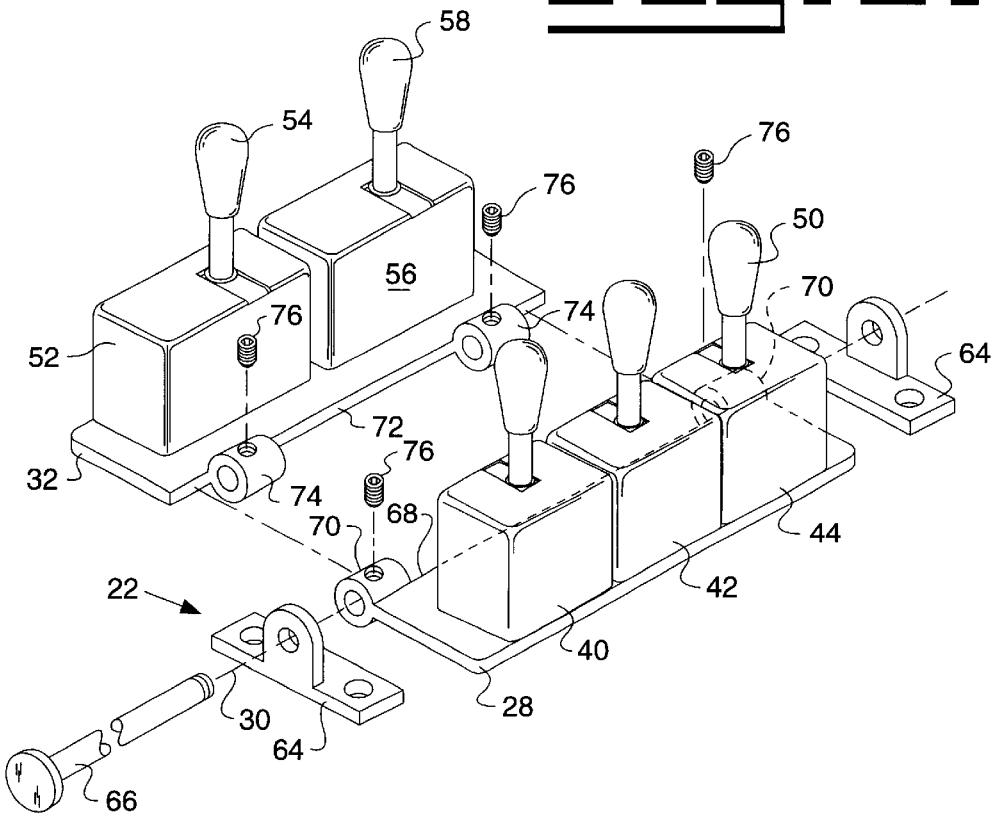
FIG. 3 is a partially exploded diagrammatic illustration of the embodiment of FIG. 1.

FIG. 3 illustrates more details regarding the preferred arrangement for supporting the support plates 28 and 32 for relative pivoting motion about the pivot axis 30. The base portion 22 preferably includes two end members 64 that support a pivot pin 66, which is disposed along the pivot axis 30. The first support plate 28 includes a first longitudinal edge 68 that is parallel to and adjacent the pivot pin 66. A pair of generally cylindrical projections 70 extend away from the first longitudinal edge 68. Similarly, the second support plate 32 includes a longitudinal edge 72 having generally cylindrical extensions 74. The pivot pin 66 preferably is received through openings defined in the end members 64 and the central openings through the extensions 70 and 74, respectively. A plurality of set screws 76 preferably are received through threaded openings in the extensions 70 and 74.

When the support plates 28 and 32 are interconnected with the pivot pin 66 and received between the end members 64, the longitudinal placement of the portions of the assembly 20 are fixed because the end members 64 preferably are fixed on a console or panel within a heavy duty vehicle, for example.

The invention preferably includes a locking mechanism for locking the support plates 28 and 32 into chosen positions to maintain a desired orientation of the control members 24. In the embodiment of FIG. 3, the set screws 76 provide such a locking mechanism. By tightening the set screws 76 to engage the pivot pin 66, the support plates are fixed so that there is no relative rotation between the pivot pin 66 and support plates 28 and 30. The pivot pin 66 can be fixed relative to the end members 64 in a conventional manner to prevent the pivot pin 66 from rotating relative to the end members 64, thereby locking the assembly 20 into a desired orientation.

Figure 4:
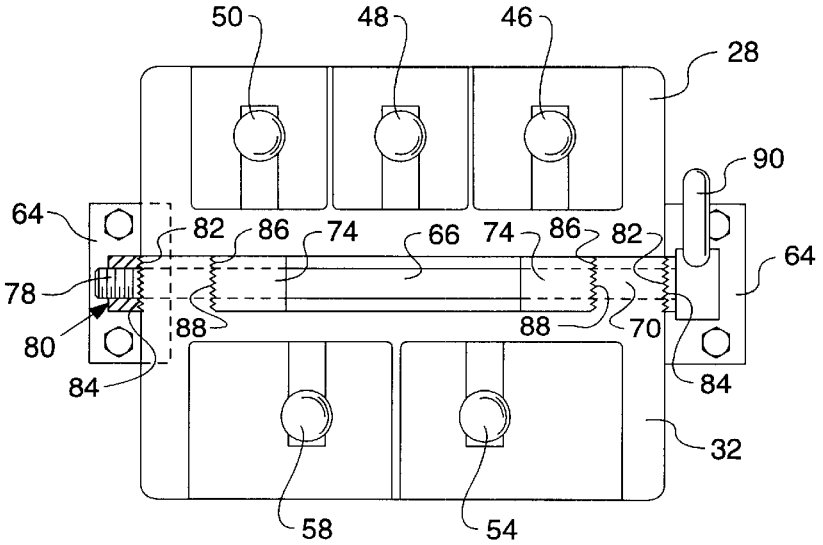
FIG. 4 is a top elevational view of a modified version of the embodiment of FIG. 1.

An alternative locking mechanism is illustrated in the embodiment of FIG. 4. In this embodiment, a threaded end 78 on the pivot pin 66 is threadedly received within a corresponding threaded opening 80 on one of the end members 64. The end members 64 preferably include teeth members 82 that selectively are interengaged with teeth members 84 on outer (according to the drawing) edges of the extensions 70. Similar teeth members 86 preferably are provided on the inner (according to the drawing) edges of the extensions 70. Corresponding teeth members 88 preferably are provided on adjacent edges of the extensions 74. The teeth members 82 and 84 and 86 and 88, respectively, interengage to maintain a desired orientation of the first and second support plates 28 and 32. The threaded connection between the threaded portion 80 on the end member 64 and the threaded end 78 of the pivot pin 66 provides the ability to selectively compress the overall arrangement so that the interengaging teeth members prevent relative movement between the support plates 28 and 32. In the preferred embodiment, a handle 90 is provided on an end of the pivot pin 66 opposite from the threaded end 78 to accomplish tightening or loosening the engagement of the interengaging teeth members.

The preferred embodiment of this invention provides that the first support plate 28 and the second support plate 32 are both pivotally moveable relative to each other and the base portion 22. An alternative (although not specifically illustrated) embodiment includes one of the support plates being fixed relative to the base portion with the other support plate being pivotably moveable about the pivot axis 30.

Industrial Applicability

This invention is useful where a plurality of control members are needed to operate the various features on heavy duty machinery, such as construction vehicles. The control assembly has moveable support plates that are adjustable into a variety of positions about a pivot axis so that the control members can be selectively placed into a variety of orientations to accommodate a variety of operator needs and preferences.

The description given above discloses the currently preferred embodiments of this invention. Variations and modifications to the disclosed embodiments may become apparent to those skilled in the art that do not necessarily depart from the purview and spirit of this invention. The scope of legal protection given to this invention can only be determined by studying the following claims.

What is claimed is:

1. An adjustable control assembly, comprising:

a plurality of control members that are independently and selectively manipulable by an operator;

a base portion;

a first support supporting at least a first one of the control members, the first support being pivotally moveable relative to the base portion about a pivot axis; and a second support supporting at least a second one of the control members, the second support being pivotally moveable relative to the base portion and the first support about the pivot axis.

2. The assembly of claim 1, further comprising a locking mechanism that is operative to selectively lock the supports into relative positions relative to each other.

3. The assembly of claim 2, wherein the first and second supports comprise generally planar platforms.

4. The assembly of claim 3, further comprising a pivot pin positioned along the pivot axis and wherein the first support includes a first longitudinal edge extending parallel and adjacent to the pivot axis and includes two generally cylindrical extensions extending from the first longitudinal edge that receive the pivot pin and wherein the second support includes a second longitudinal edge extending parallel and adjacent to the pivot axis and includes two generally cylindrical extensions extending from the second longitudinal edge that receive the pivot pin.

5. The assembly of claim 4, wherein the locking mechanism comprises a plurality of threaded members that are received in corresponding threaded openings in the generally cylindrical extensions and are adjustable such that the threaded members selectively engage the pivot pin.

6. The assembly of claim 5, wherein the pivot pin is selectively locked into a chosen position relative to the base portion.

7. The assembly of claim 4, wherein the locking mechanism includes interengaging members disposed on the generally cylindrical extensions and the base portion, respectively and a locking member that is selectively positioned to cause locking interengagement of the interengaging members.

8. The assembly of claim 2, wherein the locking mechanism is also operative to selectively lock the supports into selected positions relative to the base portion.

9. The assembly of claim 1, wherein the control members each include a housing and a moveable portion and wherein the housings are supported on the supports such that the moveable portions are selectively manipulated by an operator.

10. The assembly of claim 9, wherein the moveable portions comprise levers.

11. The assembly of claim 10, wherein the levers are sized and spaced relative to each other to collectively fit within an operator's hand.

12. An adjustable control assembly, comprising:

a plurality of control members that are independently and selectively manipulable by an operator;

a first support plate supporting at least a first one of the control members;

a second support plate supporting at least a second one of the control members; and a base supporting the first and second support plates and including a pivot pin defining a pivot axis, the first support plate having a portion that is supported on the pivot pin for pivotal movement about the pivot axis relative to the base portion and the second support plate.

13. The assembly of claim 12, wherein the second support plate includes a portion that is pivotally supported on the pivot pin for pivotal movement relative to the base and the first support plate.

14. The assembly of claim 13, further comprising a locking mechanism that is operative to selectively lock the first and second support plates into chosen positions relative to each other and the base.

15. The assembly of claim 12, further comprising a locking mechanism that is operative to selectively lock the first support plate into a chosen position relative to the second support plate.

16. The assembly of claim 15, wherein the first support plate is a generally rectangular and generally planar plate having a first longitudinal edge that is parallel and adjacent to the pivot pin and wherein the portion of the first support plate that is supported on the pivot pin includes at least one cylindrical extension extending from the first longitudinal edge that receives the pivot pin and wherein the locking mechanism includes a locking member that secures the extension from rotating relative to the pivot pin.

17. The assembly of claim 16, wherein the locking mechanism includes a plurality of teeth members on the base and a corresponding plurality of teeth members on the first support plate extension that selectively interengage the base teeth members to thereby lock the first support plate into the chosen position relative to the base.

18. The assembly of claim 17, wherein the pivot pin includes a threaded end that is threadedly received by a portion of the base and wherein the pivot pin is threaded into an engaging position that locks the teeth members into interengagement and wherein the assembly further includes a handle connected with the pivot pin to selectively thread the pivot pin into the engaging position.

19. The assembly of claim 12, wherein the control members have a size and are positioned relative to each other on the support plates such that all the control members are accessible within the grasp of an operator's hand.

20. The assembly of claim 19, wherein the control members include moveable lever portions and wherein the control members are positioned on the support plates such that the moveable lever portions are moveable without interfering with each other independent of a relative position between the first and second support plates.

* * * * *